(12) United States Patent
Raychaudhuri et al.

(10) Patent No.: US 10,725,678 B2
(45) Date of Patent: Jul. 28, 2020

(54) POWER MANAGEMENT FOR MEMORY SUBSYSTEMS

(71) Applicant: International Business Machines Corporation, Armonk, NY (US)

(72) Inventors: Arindam Raychaudhuri, Kodihalli (IN); Diyanesh B. Chinnakkonda Vidyapoornachary, Bangalore (IN); Anil Lingambudi, Bangalore (IN); Sridhar Rangarajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 15/950,958

(22) Filed: Apr. 11, 2018

(65) Prior Publication Data

US 2019/0317679 A1    Oct. 17, 2019

(51) Int. Cl.
| | | |
|---|---|---|
| G06F 1/26 | (2006.01) | |
| G06F 1/32 | (2019.01) | |
| G06F 3/06 | (2006.01) | |
| G06F 1/3225 | (2019.01) | |
| G06F 1/3234 | (2019.01) | |

(52) U.S. Cl.
CPC .......... *G06F 3/0625* (2013.01); *G06F 1/3225* (2013.01); *G06F 1/3275* (2013.01)

(58) Field of Classification Search
CPC ..... G06F 3/0625; G06F 1/3275; G06F 1/3225
See application file for complete search history.

(56) References Cited

U.S. PATENT DOCUMENTS

| | | | |
|---|---|---|---|
| 6,969,981 B1 | 11/2005 | Fairbanks et al. | |
| 7,802,116 B2 | 9/2010 | Ravichandran | |
| 8,086,876 B2 | 12/2011 | Taylor, III et al. | |
| 8,365,001 B2 | 1/2013 | Ma | |
| 8,909,948 B2 | 12/2014 | Bansal | |
| 9,606,595 B2 | 3/2017 | Varma et al. | |
| 2011/0191618 A1 | 8/2011 | Berke et al. | |
| 2014/0380067 A1* | 12/2014 | Laird | G06F 1/263 |
| | | | 713/300 |
| 2015/0185797 A1 | 7/2015 | Cooper et al. | |
| 2016/0018833 A1 | 1/2016 | Richards, III et al. | |
| 2017/0160789 A1* | 6/2017 | Hance | G06F 1/28 |

FOREIGN PATENT DOCUMENTS

GB     2480708 A    11/2011

OTHER PUBLICATIONS

Haoran Li et al., "Adaptive Power Delivery System Management for Man-Core Processors with On/Off-Chip Voltage Regulators", 2017 Design, Automation & Test in Europe Conference & Exhibition, Mar. 27-31, 2017, pp. 1265-1268.
Lisa Minwell, "Advanced Power Management in Embedded Memory Subsystems", D&R SoC News, https://www.design-reuse.com/articles/26402/power-management-in-embedded-memory-substystems.html, Aug. 31, 2017, pp. 1-6.

* cited by examiner

*Primary Examiner* — Xuxing Chen
(74) *Attorney, Agent, or Firm* — Kunzler Bean & Adamson

(57) ABSTRACT

Methods that can manage power for memory subsystems are provided. One method includes providing power to a set of memory devices via a set of power modules, determining a first amount of power being consumed by the set of memory devices, and in response to a predetermined event, modifying a second amount of power provided to the set of memory devices via a set of spare power modules. Systems and apparatuses that can include, perform, and/or implement the method are also provided.

20 Claims, 15 Drawing Sheets

POWER MANAGEMENT FOR MEMORY SUBSYSTEMS

FIELD

The subject matter disclosed herein relates to storage networks and systems and, more particularly, relates to methods and systems that can manage power for memory subsystems.

BACKGROUND

Increasing memory capacity and other advancements in technology continues to push the power requirements for memory subsystems. Specifically, growing memory density, especially with shrinking technology nodes and three-dimensional technology integration, present significant power and/or thermal challenges for various memory subsystems. For example, issues often arise with regards to how power is budgeted and/or distributed in a memory subsystem.

Some power budget and/or distribution issues can include the bulk power limit of a server node as it relates to the power budget limits of each of its subsystems (e.g., processor, memory, input/output (I/O) operations, cooling, etc.). That is, each subsystem is typically designed to operate with maximum performance within a designated power budget and the addition of greater quantities of memory devices and/or upgrading one or more existing memory devices with newer and/or more powerful memory devices can negatively impact memory performance since these additional and/or newer memory device(s) typically consume more power than the subsystem was designed to operate with and the subsystem is unable to meet the new power demand.

BRIEF SUMMARY

Methods, systems, and apparatuses that can manage power for memory subsystems are provided. One method includes providing power to a set of memory devices via a set of power modules, determining a first amount of power being consumed by the set of memory devices, and in response to a predetermined event, modifying a second amount of power provided to the set of memory devices via a set of spare power modules.

A system includes a set of memory devices and a set of power modules that provide power to the set of memory devices. The system further includes a set of spare power modules coupled to the set of memory devices and configured to controllably provide supplemental power to the set of memory devices.

One apparatus includes a power management module that can be coupled ("coupleable") to a set of memory devices and to a set of spare power modules. The power management module is configured to determine a first amount of power provided by a set of power modules that is being consumed by the set of memory devices and, in response to a predetermined event, modify a second amount of power provided to the set of memory devices via the set of spare power modules.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
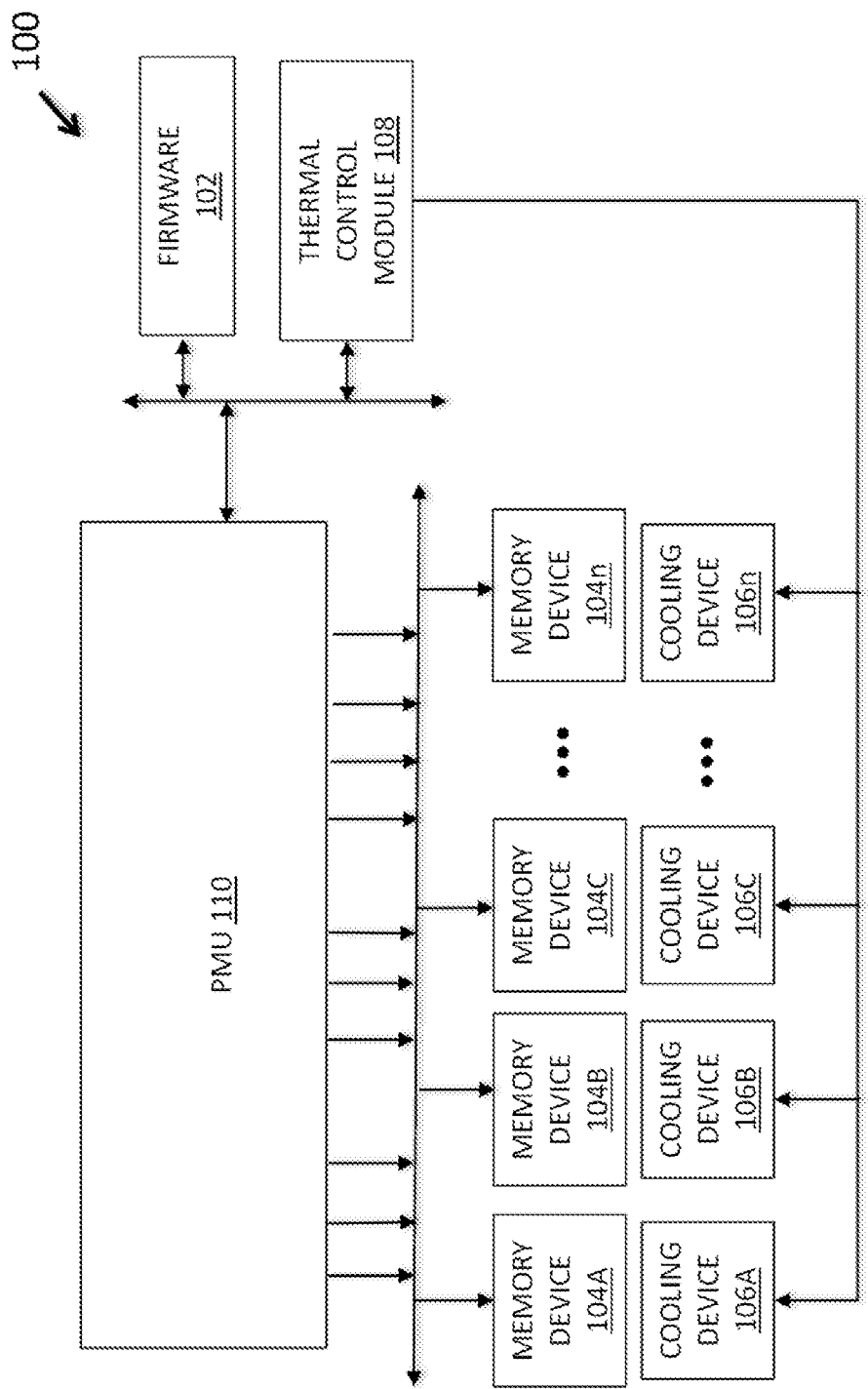
FIG. 1 is a block diagram of one embodiments of a memory subsystem.

Disclosed herein are various embodiments providing methods, systems, and computer program products that can manage power in a memory subsystem. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a memory subsystem 100 (or system). The memory subsystem 100, at least in the illustrated embodiment, includes, among other components, firmware 102, a set of memory devices 104, a set of cooling devices 106 for the memory devices 104, a thermal control module 108, and a power management unit (PMU) 110 coupled to and/or in communication with one another.

The firmware 102 may include any suitable hardware and/or software that can manage the operations of the memory subsystem 100 and/or communicate such operations to a computing device and/or system (e.g., a server). In various embodiments, the firmware 102 can include a Flexible Service Processor (FSP) manufactured by the International Business Corporation (IBM) of Armonk, N.Y. In some embodiments, the firmware 102 includes firmware that provides diagnostics, initialization, configuration, run-time error detection and/or correction operations for the memory subsystem 100.

A memory device 104 may include any suitable type of device and/or system that is known or developed in the future that can store computer-useable data. In various embodiments, a memory device 104 may include one or more non-transitory computer-usable mediums (e.g., readable, writable, readable-writable, etc.), which may include any non-transitory, electronic, and/or persistent apparatus or device that can contain, store, communicate, propagate, and/or transport instructions, data, computer programs, software, code, routines, etc., for processing by or in connection with a computer processing device. In some embodiments, a memory device 104 may include a dual in-line memory module (DIMM), among other types of memory devices (e.g., electronic memory devices, etc.) that are possible and contemplated herein.

A set of memory devices 104a, 104b, 104c, . . . 104n (also simply referred individually, in various groups, or collectively as memory device(s) 104) may include any suitable quantity of memory devices 104 for a particular application and/or computing system. While the illustrated embodiment includes four (4) memory devices 104, various other embodiments may include less than or greater than four memory devices 104. That is, the various embodiments discussed herein are not limited to four memory devices 104.

In some embodiments, a set of memory devices 104 may be upgradeable in terms of the quantity of memory devices 104. For example, the embodiment illustrated in FIG. 1 may be upgradeable to add one or more additional memory devices 104 such that the set of memory devices 104 can include a greater quantity of memory devices 104 than four memory devices 104 (e.g., five (5), six (6), seven (7), eight (8), sixteen (16), thirty-two (32), sixty-four (64), one hundred twenty-eight (128), two hundred fifty-six (256), five hundred twelve (512), . . . etc., or more memory devices 104).

In addition, at least one memory device 104 in a set of memory devices 104 may be replaceable and/or upgradeable. That is, the memory device(s) 104 may be replaced with another memory device 104 in response to, for example, a device failure and/or a device/system upgrade. The replacement memory device(s) 104 may include the same type of memory device 104 or a different type and/or quality of memory device 104. For example, the replacement memory device 104 may be the same type (e.g., identical) of memory device 104 that consumes the same amount of power or may include a different and/or upgraded type (e.g., larger storage capacity, faster, more secure, brand type, etc.) of memory device 104 than may consume more power than the replaced memory device 104.

A cooling device 106 may include any suitable type of device and/or system that is known or developed in the future that can facilitate reducing the temperature (e.g., cool) one or more memory devices 104. In various embodiments, a cooling device 106 may include a fan (e.g., a variable speed fan), among other types of cooling devices and/or systems that are possible and contemplated herein.

A set of cooling devices 106a, 106b, 106c, . . . 106n (also simply referred individually, in various groups, or collectively as cooling device(s) 106) may include any suitable quantity of cooling devices 106 that can maintain the operational temperature(s) of one or more memory devices 104 in a set of memory devices 104 within a predetermine temperature range and/or below a predetermined temperature (e.g., at a below a predetermined temperature). While the illustrated embodiment includes four (4) cooling devices 106, various other embodiments may include less than or greater than four cooling devices 106. That is, the various embodiments discussed herein are not limited to four cooling devices 106.

In some embodiments, a set of cooling devices 106 may be upgradeable in terms of the quantity of cooling devices 106. For example, the embodiment illustrated in FIG. 1 may be upgradeable to add one or more additional cooling devices 106 such that the set of cooling devices 106 can include a greater quantity of cooling devices 106 than four cooling devices 106 (e.g., five (5), six (6), seven (7), eight (8), sixteen (16), thirty-two (32), sixty-four (64), one hundred twenty-eight (128), two hundred fifty-six (256), five hundred twelve (512), ... etc., or more cooling devices 106).

In various embodiments, the quantity of cooling devices 106 may correspond to the quantity of memory devices 104. That is, some embodiments may include a 1:1 ratio of cooling devices 106 to memory devices 104, among other ratios that are possible and contemplated herein.

In addition, at least one cooling device 106 in a set of cooling devices 106 may be modifiable. That is, the cooling device(s) 106 may be modified to cool one or more additional memory devices 104 in response to, for example, a failure of a memory device 104 and/or a device/system upgrade. For example, a cooling device 106 may facilitate cooling an additional memory device 104 in response to the addition of the memory device 104 to the set of memory devices 104. In another non-limiting example, a cooling device 106 may facilitate cooling a replacement memory device 104 in response to the replacement memory device 104 generating more or less heat than one or more replaced memory device(s) 104, which may be the by-product of the replacement memory device(s) 104 consuming more or less power than the replaced memory device(s) 104.

A thermal control module 108 may include any suitable hardware and/or software that can manage a set of cooling devices 106. A thermal control module 108 determine/detect the amount of heat generated by each memory device 104 in a set of memory devices 104 and control the operational state (e.g., ON/OFF state) of each cooling device 106 in a set of cooling devices 106 in response thereto. For example, in response to a memory device 104 including a temperature greater than or equal to a predetermined temperature, the thermal control module 108 may command the cooling device 106 corresponding to the memory device 104 to turn ON to facilitate reducing the temperature of the memory device 104. Subsequently, in response to the memory device 104 including a temperature less than the predetermined temperature, the thermal control module 108 may command the cooling device 106 corresponding to the memory device 104 to turn OFF since the memory device 104 is no longer operating above the predetermined temperature threshold.

A PMU 110, may include any suitable hardware and/or software that can provide primary power to a set of memory devices 104. In various embodiments, the PMU 110 can further include any suitable hardware and/or software that can provide auxiliary power to the set of memory devices 104.

Figure 2:
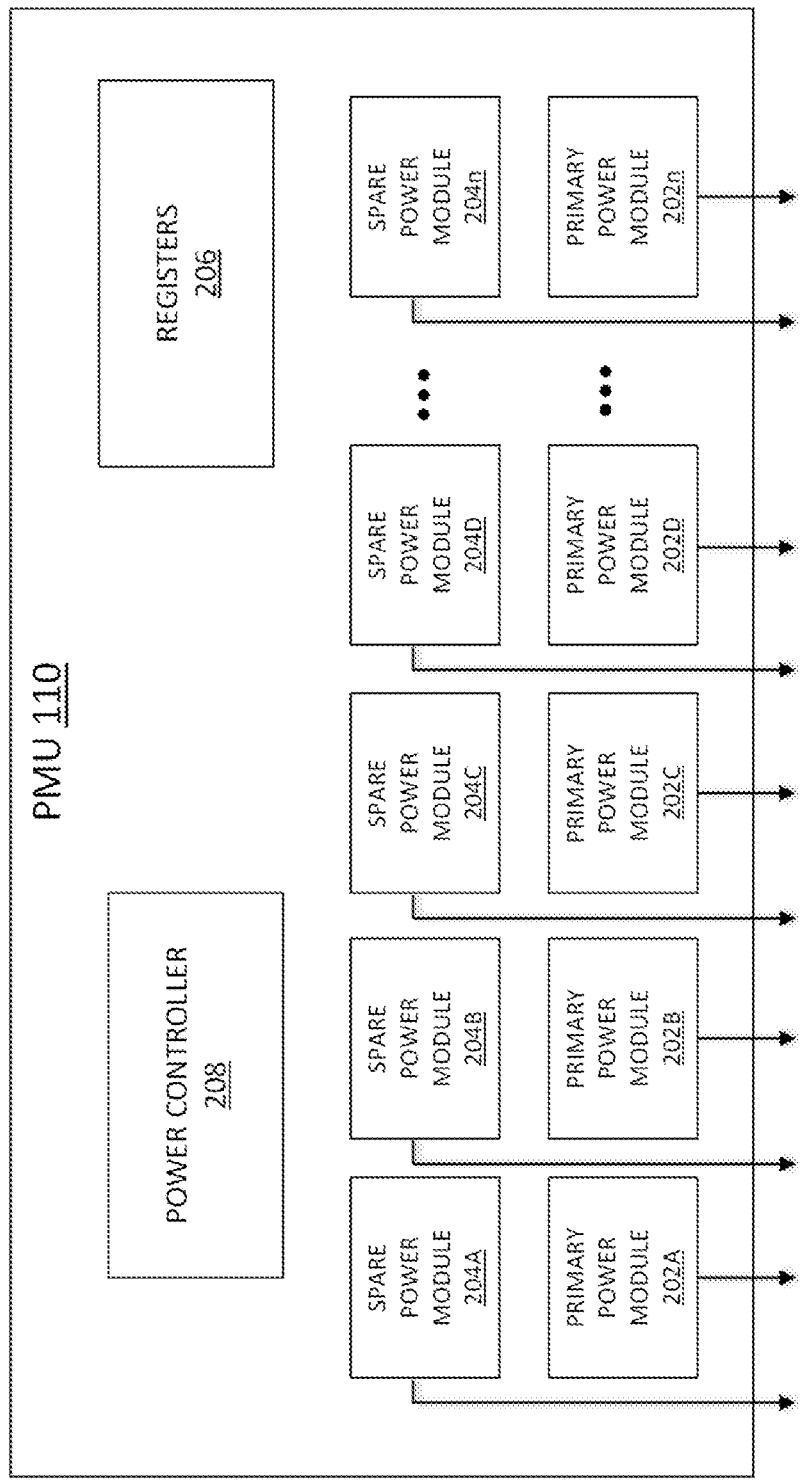
FIG. 2 is a block diagram of one embodiment of a power management unit (PMU) that can be included in the memory subsystem of FIG. 1.

Referring now to FIG. 2, FIG. 2 is a block diagram of one embodiment of a PMU 110 (or power management module). The PMU 110, at least in the illustrated embodiment, includes, among other components, a set of power modules 202 (e.g., a primary set of power modules 202) for the set of memory devices 104, a set of spare power modules 204 (e.g., an auxiliary set of power modules 204) for the set of memory devices 104, a set of registers 206, and a power controller 208 coupled to and/or in communication with one another.

A power module 202 may include any suitable hardware and/or software that can provide power to the set of memory devices 104. In some embodiments, a power module 202 may include a voltage regulator module (VRM), a processor power module (PPM), a buck converter, a step-down converter, a DC-to-DC converter, etc., among other types of devices that can provide power to a set of memory devices 104 that are possible and contemplated herein.

A set of power modules 202A, 202B, 202C, 202D, ... 202n (also simply referred individually, in various groups, or collectively as power module(s) 202) may include any suitable quantity of power modules 202 that can provide power to the one or more memory devices 104 in a set of memory devices 104. While the illustrated embodiment includes five (5) power modules 202, various other embodiments may include less than or greater than five power modules 202. That is, the various embodiments discussed herein are not limited to five power modules 202.

The set of power modules 202 may provide any suitable amount of power to the set of memory devices 104. That is, different embodiments of the set of power modules 202 may provide different amounts of power to the set of memory devices 104 based on the various possible configurations and/or power requirements of the set of memory devices 104.

A spare power module 204 may include any suitable hardware and/or software that can provide auxiliary and/or supplemental power to the set of memory devices 104. In some embodiments, a spare power module 204 may include a VRM, a PPM, a buck converter, a step-down converter, a DC-to-DC converter, etc., among other types of devices that can provide power to a set of memory devices 104 that are possible and contemplated herein.

In some embodiments, the spare power module(s) 204 and the power modules 202 are the same type of device that can provide power to the set of memory devices 104. In other embodiments, at least one spare power module 204 and one power module 202 are different types of device that can provide power to the set of memory devices 104.

A set of spare power modules 204A, 204B, 204C, 204D, ... 204n (also simply referred individually, in various groups, or collectively as spare power module(s) 204) may include any suitable quantity of spare power modules 204 that can provide power to the one or more memory devices 104 in a set of memory devices 104. While the illustrated embodiment includes four (4) spare power modules 204, various other embodiments may include less than or greater than four spare power modules 204. That is, the various embodiments discussed herein are not limited to four spare power modules 204.

A spare power module 204 may include any suitable size that is known or developed in the future for a particular application. That is, a spare power module 204 can be configured to supply any suitable amount of power. In various embodiments, a spare power module 204 can supply an amount of power on the range of about one watt (1 W) to about one hundred watts (100 W), although other amounts of power are possible and contemplated herein. Non-limiting examples of a spare power module 204 include spare power modules 204 that can supply 1 W, 2 W, 4 W, 5 W, 10 W, 20 W, 50 W, and 100 W of power, among other power amounts that are possible and contemplated herein.

In various embodiments, at least one spare power module 204 may be controllable to be selectively turned ON and OFF. In some embodiments, two or more spare power modules 204 may be controllable to be selectively turned ON and OFF, while in further embodiments each power module 204 may be controllable to be selectively turned ON and OFF. That is, the spare power module(s) 204 may not, but can be, always in use to provide power to the set of memory devices 104.

For example, in response to receiving a command (e.g., a power up command) from the power controller 208, a spare power module 204 can be turned ON to begin supplying supplemental and/or auxiliary power to one or more memory devices 104 in the set of memory devices 104. Further, in response to receiving another command (e.g., a power down command) from the power controller 208, a spare power module 204 can be turned OFF to cease supplying supplemental and/or auxiliary power to one or more memory devices 104 in the set of memory devices 104.

In some embodiments, the set of spare power modules 204 can function as a power bank that can gradually and/or incrementally increase/decrease the amount of supplemental power provided to the set of memory devices 104 by turning ON/OFF individual spare power modules 204 in the set of spare power modules 204. That is, as a greater quantity of spare power modules 204 are turned ON, more supplemental power is provided to the set of memory devices 104. Similarly, as spare power modules 204 are turned OFF, less supplemental power is provided to the set of memory devices 104.

A set of spare power modules 204 can supply/provide any suitable amount of auxiliary power to a set of memory devices 104. In various embodiments, a set of spare power module 204 can supply an amount of power on the range of about 1 W to about 1000 W, although other amounts of power are possible and contemplated herein. Example amounts of spare power that a set of spare power modules 204 that can supply include, but are not limited to, 10 W, 20 W, 40 W, 50 W, 100 W, 200 W, 500 W, and 1000 W of power, among other amounts of power that are possible and contemplated herein.

To supply a particular amount of power, a set of spare power modules 204 can include any suitable combination of quantity and/or sized power module(s) 204. For example, a set of spare power modules 204 can incrementally provide up to about 100 W of auxiliary power to a set of memory devices 104 using five (5), 20 W spare power modules 204. In this non-limiting example, each spare power module 204 provides about 20 W of power so that when in use, the set of spare power modules 204 can incrementally provide 20 W, 40 W, 60 W, 80 W, and 100 W of power as spare power module 204 is turned ON/OFF. That is, when a single spare power module 204 is turned ON the set of spare power modules 204 provides 20 W of power, when two (2) spare power modules 204 are turned ON the set of spare power modules 204 provides 40 W of power, when three (3) spare power modules 204 are turned ON the set of spare power modules 204 provides 60 W of power, when four spare power module 204 are turned ON the set of spare power modules 204 provides 80 W of power, and when all of the spare power modules 204 are turned ON the set of spare power modules 204 provides 100 W of power.

Another non-limiting example may provide 100 W of supplemental power using a set of ten (10), 10 W spare power modules 204 to increase/decrease the supplemental amount of power in increments of 10 W, while yet another non-limiting example may provide 100 W of supplemental power using a set of two (2), 50 W spare power modules 204 to increase/decrease the supplemental amount of power in increments of 50 W. As such, one skilled in the art will recognize that there a sizable number of size/quantity combinations of spare power modules 204 in a set of spare power modules 204 to provide a particular amount of power to a set of memory devices 104, each of which is contemplated herein. That is, the above examples are used to better understand the various embodiments discussed herein and are not intended to limit the scope and/or spirit of the various embodiments in any manner. The ON/OFF state of each spare power module 204 in a set of spare power modules 204 can be tracked using a set of registers 206.

Figure 3:
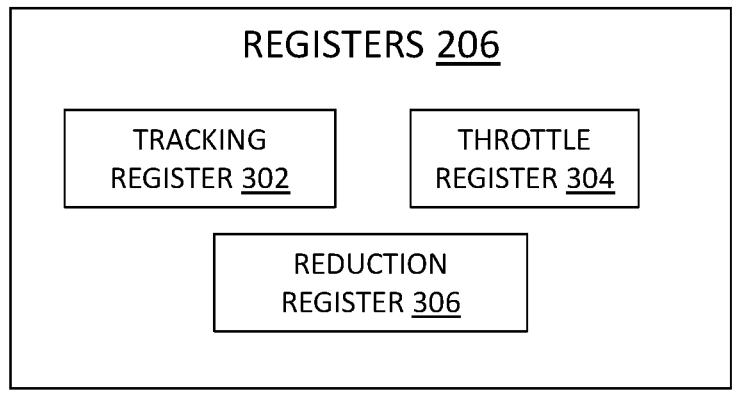
FIG. 3 is a block diagram showing one embodiment of a set of registers that can be included in the PMU of FIG. 2.

Referring to FIG. 3, FIG. 3 is a block diagram of one embodiment of set of registers 206. At least in the illustrated embodiment, a set of registers 206 includes, among other registers, a tracking register 302, a throttle register 304, and a reduction register 306.

A tracking register 302 can include any suitable hardware and/or software that can track the ON/OFF state of each spare power module 204 in a set of power modules 204. Further, a tracking register 302 can include any suitable quantity of elements that can track the ON/OFF state of each spare power module 204 in a set of power modules 204.

In various embodiments, a tracking register 302 can include a set of 1-bit elements. For example, a value of "0" may indicate that a spare power module 204 is "OFF," while a value of "1" may indicate that the spare power module 204 is "ON," or vice-versa.

The quantity of 1-bit elements, in some embodiments, may correspond to the quantity of spare power modules 204 in which a 1-bit element is assigned to each respective spare power module 204 in a 1:1 ratio. For example, a tracking register 302 may include five (5) 1-bit elements to track the ON/OFF state of each spare power module 204 in a set of five (5) spare power modules 204. One skilled in the art will recognize that other ratios are possible, each of which are contemplated herein.

A throttle register 304 can include any suitable hardware and/or software that can indicate whether a set of memory devices 104 is being supplied with a sufficient amount of power. In some embodiments, a throttle register 304 can include a 1-bit element in which a value of "0" may indicate that a sufficient amount of power is being supplied to the set of memory devices 104, while a value of "1" may indicate that an insufficient amount of power is being supplied to the set of memory devices 104, or vice-versa.

A reduction register 306 can include any suitable hardware and/or software that can indicate whether a set of memory devices 104 is being supplied with an excess amount of power. In some embodiments, a reduction register 306 can include a 1-bit element in which a value of "0" may indicate that a sufficient amount of power is being supplied to the set of memory devices 104, while a value of "1" may indicate that an excess amount of power is being supplied to the set of memory devices 104, or vice-versa.

Figure 4:
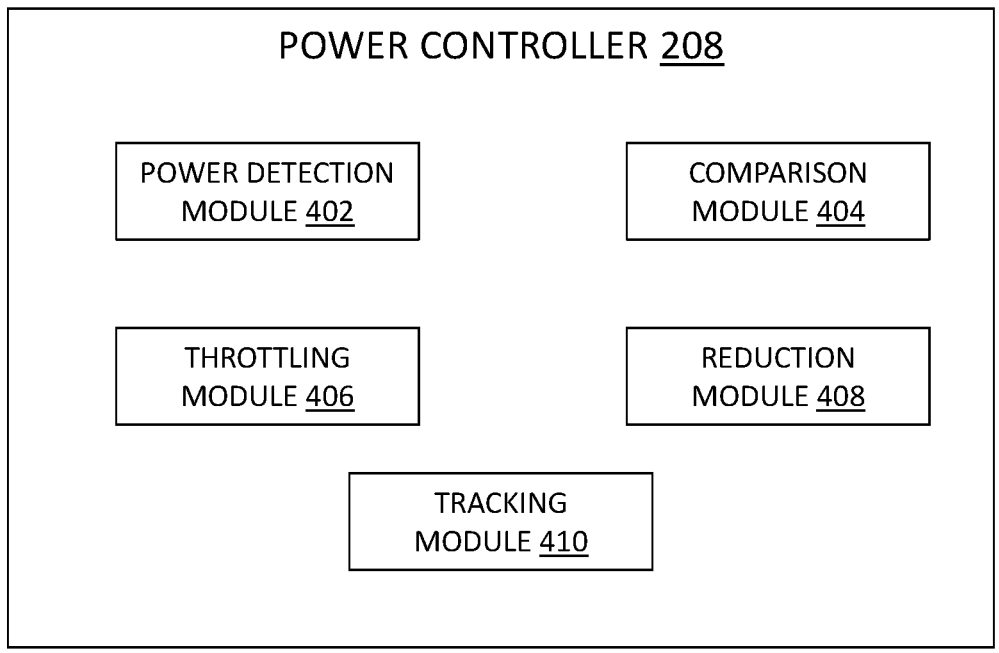
FIG. 4 is a block diagram showing one embodiment of a power controller that can be included in the PMU of FIG. 2.

Referring now to FIG. 4, FIG. 4 is a block diagram of one embodiment of a power controller 208 included in the PMU 110 discussed with reference to FIG. 2. In some embodiments, a power controller 208 may be considered a programmable load distribution controller (PLDC) that can provide memory power/performance on demand (MPOD). At least in the illustrated embodiment, a power controller 208 includes, among other elements, a power detection module 402, a comparison module 404, a throttling module 406, a reduction module 408, and a tracking module 410.

In some embodiments, a power detection module 402 may include any suitable hardware that can detect the amount of power being consumed by a set of memory devices 104. In other embodiments, a power detection module 402 may include any suitable software that can detect the amount of power being consumed by a set of memory devices 104. In yet other embodiments, a power detection module 402 may include any suitable combination of hardware and software that can detect the amount of power being consumed by a set of memory devices 104. In still other embodiments, a power detection module 402 may include any suitable combination of hardware and/or software that can detect the amount of power being consumed by a set of memory devices 104.

A comparison module 404 may include any suitable hardware and/or that can compare the amount of power being consumed by a set of memory devices 104 and the amount of power being supplied to the set of memory devices 104. In some embodiments, the comparison module 404 can determine if a sufficient amount and/or an insufficient amount of power is being supplied to the set of memory devices 104 (e.g., a sufficient/insufficient power amount state) based on the comparison. That is, the comparison module can determine whether the memory device(s) 104 are consuming greater than a predetermined and/or threshold amount of power (or greater than or equal to, less than, or less than or equal to) and base the sufficient/insufficient power amount state on such determination. The comparison module 404 can communicate the sufficient/insufficient power amount state to a throttling module 406.

In additional or alternative embodiments, the comparison module 404 can determine if a sufficient amount and/or an excess amount of power is being supplied to the set of memory devices 104 (e.g., a sufficient/excess power amount state) based on the comparison. That is, the comparison module can determine whether the memory device(s) 104 are consuming an amount of power in excess of (or in excess or equal to, less than, or less than or equal to) a predetermined and/or threshold and base the sufficient/insufficient power amount state on such determination. The comparison module 404 can communicate the sufficient/excess power amount state to a reduction module 408.

A throttling module 406 may include any suitable hardware and/or that can increase the amount of power being supplied to the set of memory devices 104. In various embodiments, the throttling module 406 can increase the amount of power being supplied to the set of memory devices 104 using the set of spare power modules 204. For example, in response to receiving a notice (e.g., a command, a signal, etc.) from a comparison module 404 that a set of memory devices 104 is consuming greater than a predetermined/threshold amount of power, the throttling module 406 can turn ON one or more spare power modules 204 in a set of spare power modules 204 to provide supplemental and/or auxiliary power to the set of memory devices 104.

The throttling module 406 can turn ON the one or more spare power modules 204 incrementally in response to multiple notices from the comparison module 404. Additionally, or alternatively, the throttling module 406 can turn ON two or more spare power modules 204 at the same time or substantially the same time in response to a single notice from the comparison module 404.

A reduction module 408 may include any suitable hardware and/or that can decrease the amount of power being supplied to the set of memory devices 104. In various embodiments, the reduction module 408 can decrease the amount of power being supplied to the set of memory devices 104 by the set of spare power modules 204. For example, in response to receiving a notice (e.g., a command, a signal, etc.) from a comparison module 404 that a set of memory devices 104 is being supplied with an excess amount of power (e.g., is being supplied with greater than a predetermined/threshold amount of power than the set of memory devices 104 is consuming), the reduction module 408 can turn OFF one or more spare power modules 204 in a set of spare power modules 204 that are providing supplemental and/or auxiliary power to the set of memory devices 104.

The reduction module 408 can turn OFF the one or more spare power modules 204 incrementally in response to multiple notices from the comparison module 404. Additionally, or alternatively, the reduction module 408 can turn OFF two or more spare power modules 204 at the same time or substantially the same time in response to a single notice from the comparison module 404.

A tracking module 410 may include any suitable hardware and/or software that can track the ON/OFF state of each spare power module 204 in a set of power modules 204. In various embodiments, a tracking module 410 can track the ON/OFF state of each spare power module 204 using the tracking register 302.

In some embodiments, a tracking module 410 can change the ON/OFF state of the spare power module 204 in the tracking register 302 in response to a throttling module 406 turning ON a spare power module 204. For example, in response to a spare power module 204 being turned ON, the tracking module 410 can change the 1-bit element corresponding to the spare power module 204 to indicate such ON state (e.g., change the 1-bit element from a value of "0" to a value of "1" or vice-versa).

In additional or alternative embodiments, a tracking module 410 can change the ON/OFF state of the spare power module 204 in the tracking register 302 in response to a reduction module 408 turning OFF a spare power module 204. For example, in response to a spare power module 204 being turned OFF, the tracking module 410 can change the 1-bit element corresponding to the spare power module 204 to indicate such OFF state (e.g., change the 1-bit element from a value of "1" to a value of "0" or vice-versa).

The following example in FIGS. 5A through 5J may be helpful in understanding the principles of the various embodiments discussed herein. This example is not intended to limit the scope of the various embodiments, but rather to assist in comprehension. In this example, a set of spare power modules 204 is configured to provide 100 W of power to a set of memory devices 104 in which spare power modules 204a, 204b, 204c, 204d, and 204e are each configured to provide 20 W of power when turned ON. Further, a tracking register 302 includes five (5) 1-bit elements 502A, 502B, 502C, 502D, and 502E that correspond to spare power modules 204A, 204B, 204C, 204D, and 204E, respectively.

Figure 5A:
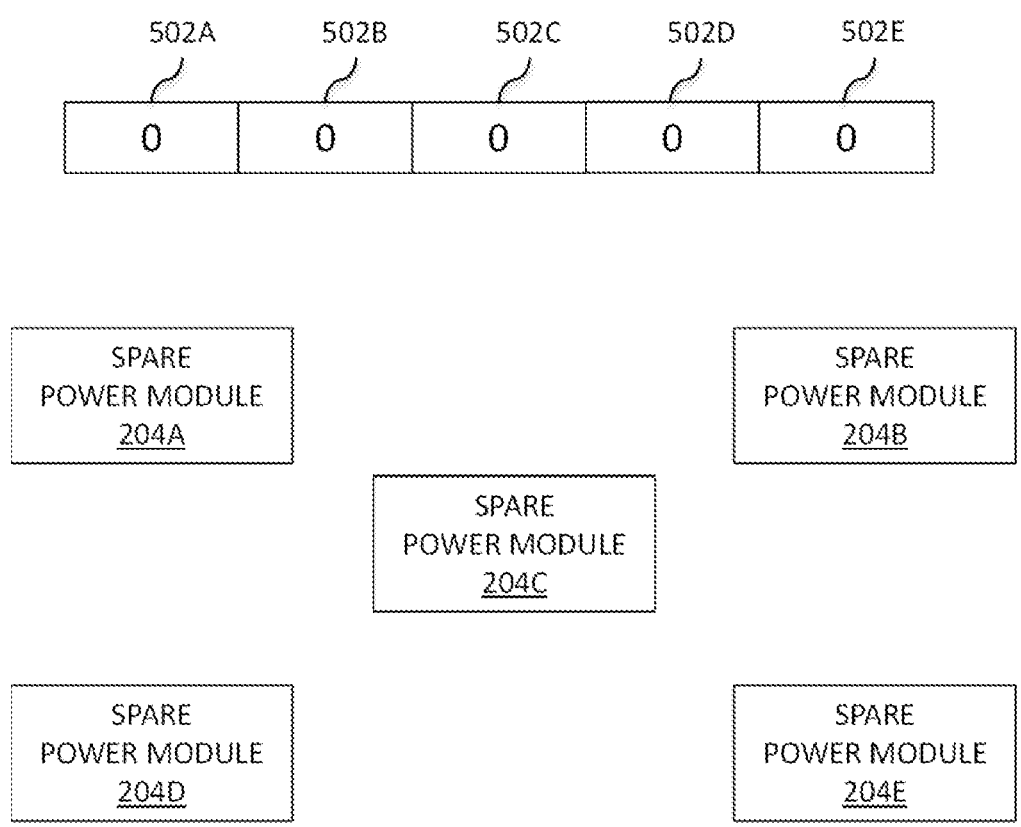
FIGS. 5A through 5J illustrate timing diagrams of one embodiment of operations of a power controller, set of spare voltage regulator modules, and a tracking register.

The timing diagram of FIG. 5A illustrates one example of the ON/OFF state of a set of spare power modules 204A, 204B, 204C, 204D, and 204E at time T0. Here, each of the spare power modules are OFF, which is indicated by "0" value in each of the 1-bit elements 502A, 502B, 502C, 502D, and 502E.

Figure 5B:
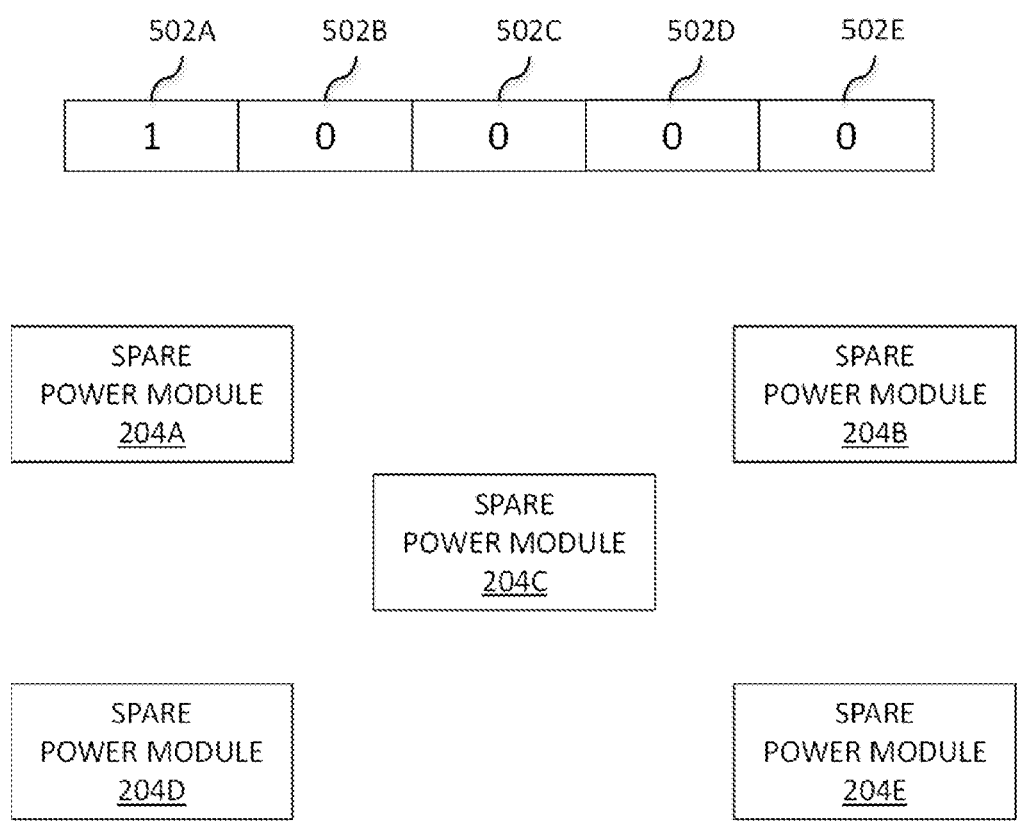

In FIG. 5B, which shows the ON/OFF state a time T1, a spare power module 204A has been turned ON by a throttling module 406 and spare power modules 204B, 204C, 204D, and 204E remain OFF, as indicated by the "1" value in 1-bit element 502A and the "0" value in each of the 1-bit elements 502B, 502C, 502D, and 502E. The spare power module 204a being ON provides 20 W of auxiliary power to the set of memory devices 104.

The 20 W of auxiliary power may be provided to the set of memory devices 104 in response to the power detection module 402 and the comparison module 404 determining that the set of memory devices 104 is consuming greater than a first threshold amount of power. The set of memory devices 104 may be consuming greater than the first threshold amount of power in response to one or more memory devices 104 being added to the set of memory devices 104 and/or one or more memory devices 104 in the set of memory devices 104 having been replaced by a replacement memory device 104 that consumes more power than the replaced memory device 104.

Figure 5C:
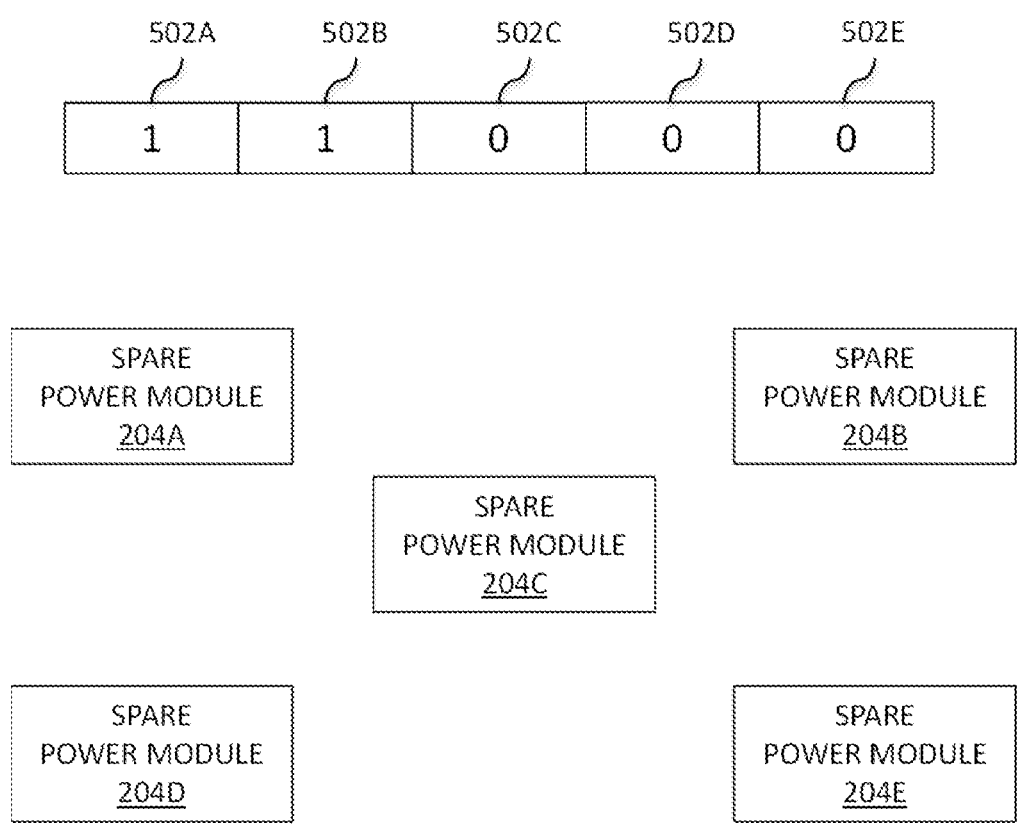

In FIG. 5C, which shows the ON/OFF state a time T2, a spare power module 204B has been turned ON by the throttling module 406 and spare power modules 204C, 204D, and 204E remain OFF, as indicated by the "1" value in 1-bit elements 502A and 502B and the "0" value in each of the 1-bit elements 502C, 502D, and 502E. The spare power modules 204A and 204B being ON provides 40 W of auxiliary power to the set of memory devices 104.

The 40 W of auxiliary power may be provided to the set of memory devices 104 in response to the power detection module 402 and the comparison module 404 determining that the set of memory devices 104 is consuming greater than a second threshold amount of power. The set of memory devices 104 may be consuming greater than the second threshold amount of power in response to one or more memory devices 104 being added to the set of memory devices 104 and/or one or more memory devices 104 in the set of memory devices 104 having been replaced by a replacement memory device 104 that consumes more power than the replaced memory device 104.

Figure 5D:
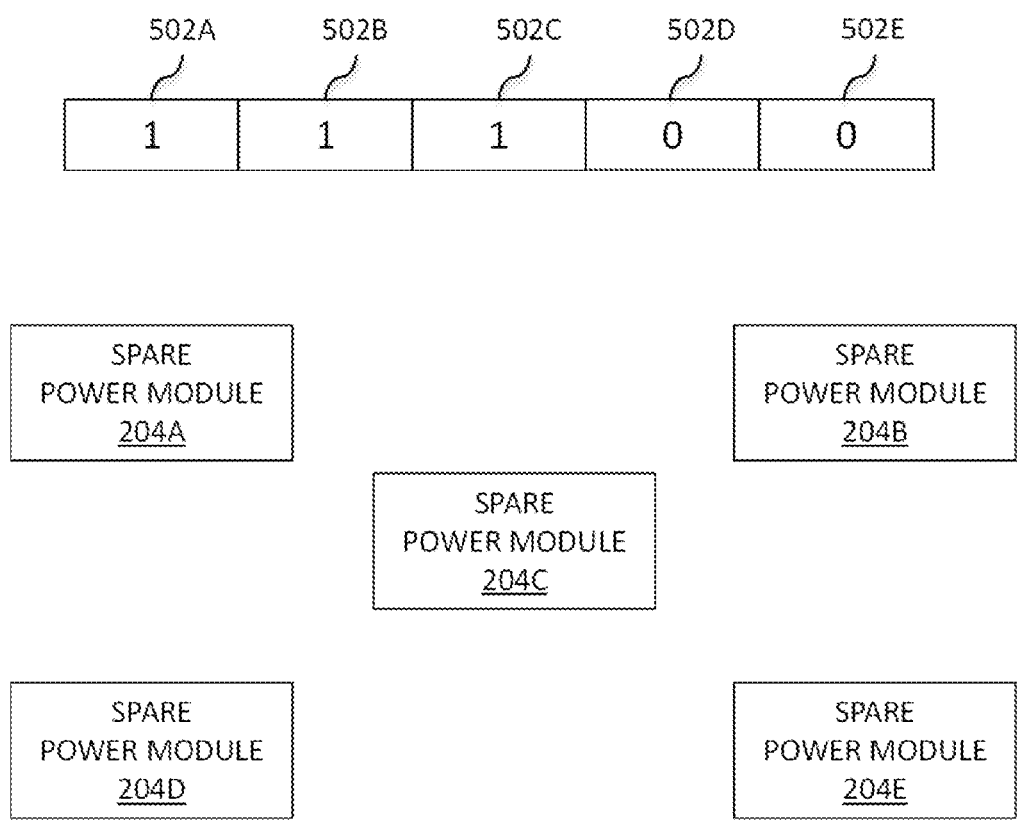

In FIG. 5D, which shows the ON/OFF state a time T3, a spare power module 204C has been turned ON by the throttling module 406 and spare power modules 204D and 204E remain OFF, as indicated by the "1" value in 1-bit elements 502A, 502B, and 502C and the "0" value in each of the 1-bit elements 502D and 502E. The spare power modules 204A, 204B, and 204C being ON provides 60 W of auxiliary power to the set of memory devices 104.

The 60 W of auxiliary power may be provided to the set of memory devices 104 in response to the power detection module 402 and the comparison module 404 determining that the set of memory devices 104 is consuming greater than a third threshold amount of power. The set of memory devices 104 may be consuming greater than the third threshold amount of power in response to one or more memory devices 104 being added to the set of memory devices 104 and/or one or more memory devices 104 in the set of memory devices 104 having been replaced by a replacement memory device 104 that consumes more power than the replaced memory device 104.

Figure 5E:
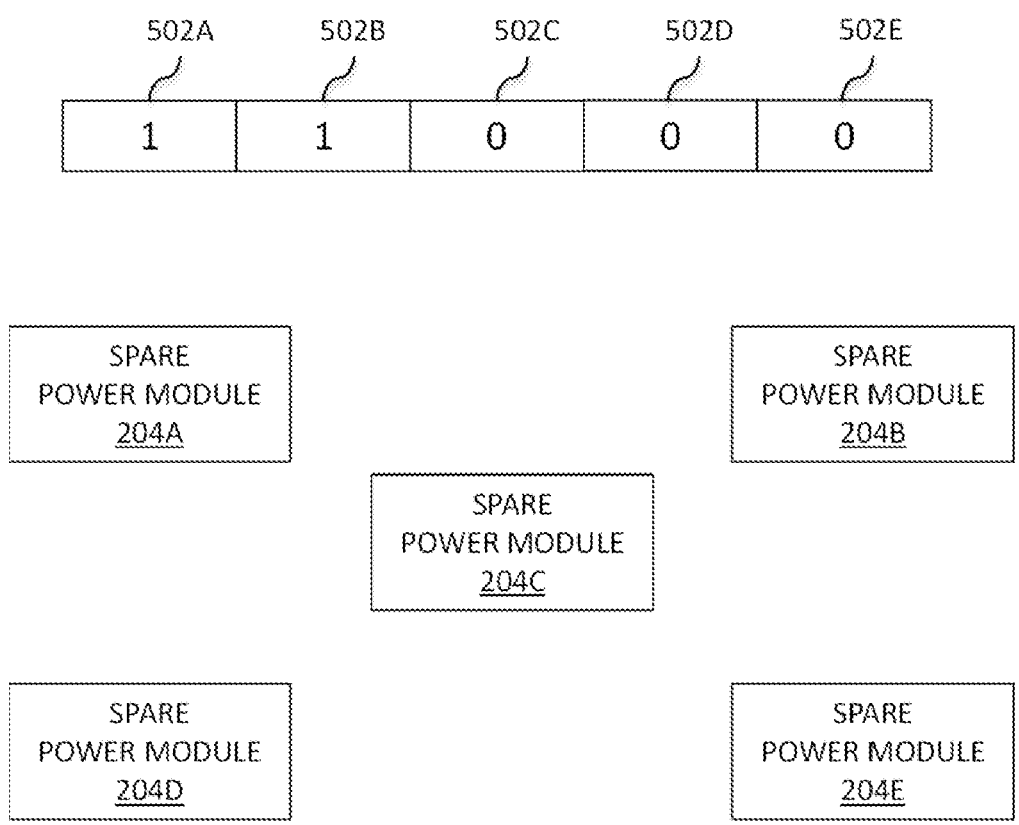

In FIG. 5E, which shows the ON/OFF state a time T4, a spare power module 204C has been turned OFF by the reduction module 408 and spare power modules 204D and 204E remain OFF, as indicated by the "1" value in 1-bit elements 502A and 502B and the "0" value in each of the 1-bit elements 502C, 502D, and 502E. The spare power modules 204A and 204B being ON provides 40 W of auxiliary power to the set of memory devices 104. The reduction of 20 W of auxiliary power provided to the set of memory devices 104 may be in response to the power detection module 402 and the comparison module 404 determining that the set of memory devices 104 is consuming greater than the second threshold amount of power and less than the third threshold amount of power.

Figure 5F:
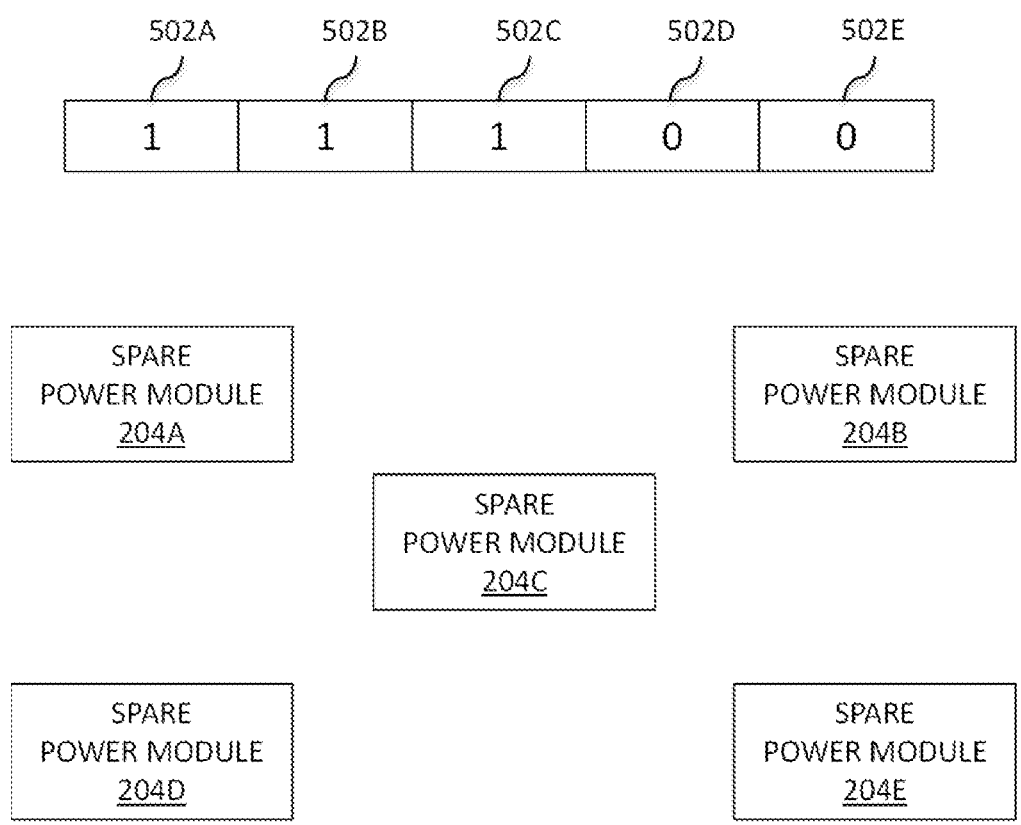

In FIG. 5F, which shows the ON/OFF state a time T5, a spare power module 204C has been turned ON by the throttling module 406 and spare power modules 204D and 204E remain OFF, as indicated by the "1" value in 1-bit elements 502A, 502B, and 502C and the "0" value in each of the 1-bit elements 502D and 502E. The spare power modules 204A, 204B, and 204C being ON provides 60 W of auxiliary power to the set of memory devices 104.

The 60 W of auxiliary power may be provided to the set of memory devices 104 in response to the power detection module 402 and the comparison module 404 determining that the set of memory devices 104 is consuming greater than a third threshold amount of power. The set of memory devices 104 may be consuming greater than the third threshold amount of power in response to one or more memory devices 104 being added to the set of memory devices 104 and/or one or more memory devices 104 in the set of memory devices 104 having been replaced by a replacement memory device 104 that consumes more power than the replaced memory device 104.

Figure 5G:
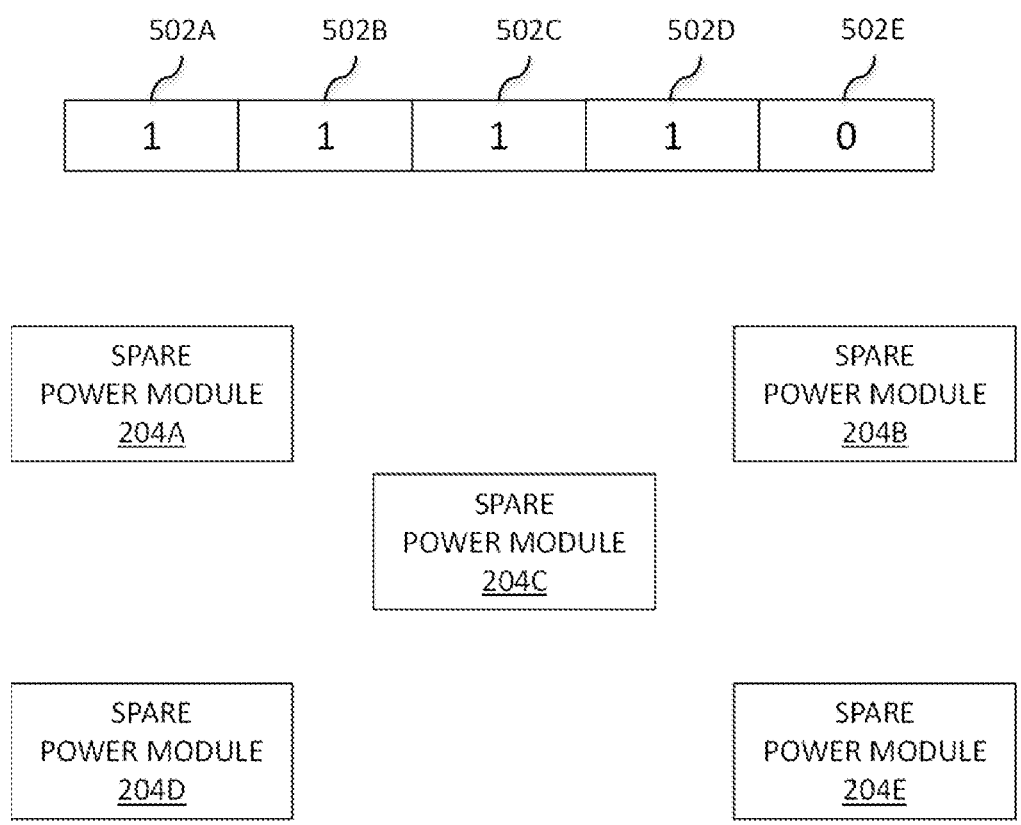

In FIG. 5G, which shows the ON/OFF state a time T6, a spare power module 204D has been turned ON by the throttling module 406 and spare power module 204E remains OFF, as indicated by the "1" value in 1-bit elements 502A, 502B, 502C, and 502D and the "0" value in the 1-bit element 502E. The spare power modules 204A, 204B, 204C, and 204D being ON provides 80 W of auxiliary power to the set of memory devices 104.

The 80 W of auxiliary power may be provided to the set of memory devices 104 in response to the power detection module 402 and the comparison module 404 determining that the set of memory devices 104 is consuming greater than a fourth threshold amount of power. The set of memory devices 104 may be consuming greater than the fourth threshold amount of power in response to one or more memory devices 104 being added to the set of memory devices 104 and/or one or more memory devices 104 in the set of memory devices 104 having been replaced by a replacement memory device 104 that consumes more power than the replaced memory device 104.

Figure 5H:
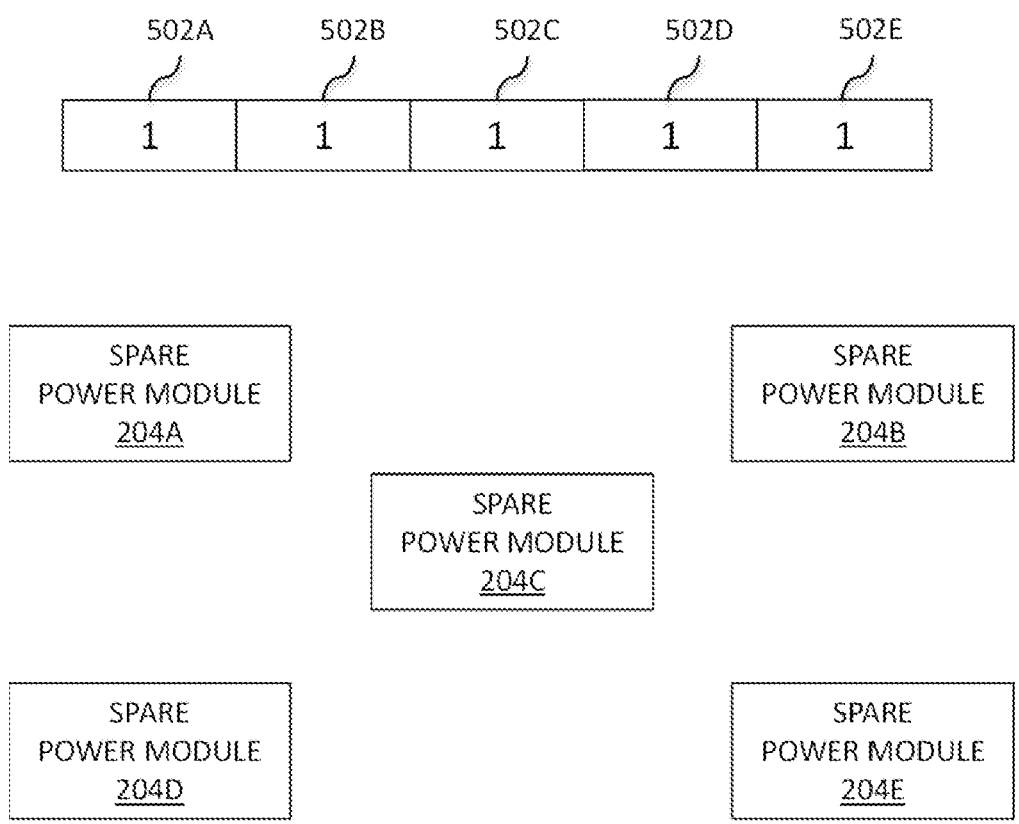

In FIG. 5H, which shows the ON/OFF state a time T7, a spare power module 204E has been turned ON by the throttling module 406 as indicated by the "1" value in each of 1-bit elements 502A, 502B, 502C, 502D, and 502E. The spare power modules 204A, 204B, 204C, 204D, and 204E being ON provides 100 W of auxiliary power to the set of memory devices 104.

The 100 W of auxiliary power may be provided to the set of memory devices 104 in response to the power detection module 402 and the comparison module 404 determining that the set of memory devices 104 is consuming greater than a fifth threshold amount of power. The set of memory devices 104 may be consuming greater than the fifth threshold amount of power in response to one or more memory devices 104 being added to the set of memory devices 104 and/or one or more memory devices 104 in the set of memory devices 104 having been replaced by a replacement memory device 104 that consumes more power than the replaced memory device 104.

Figure 5I:
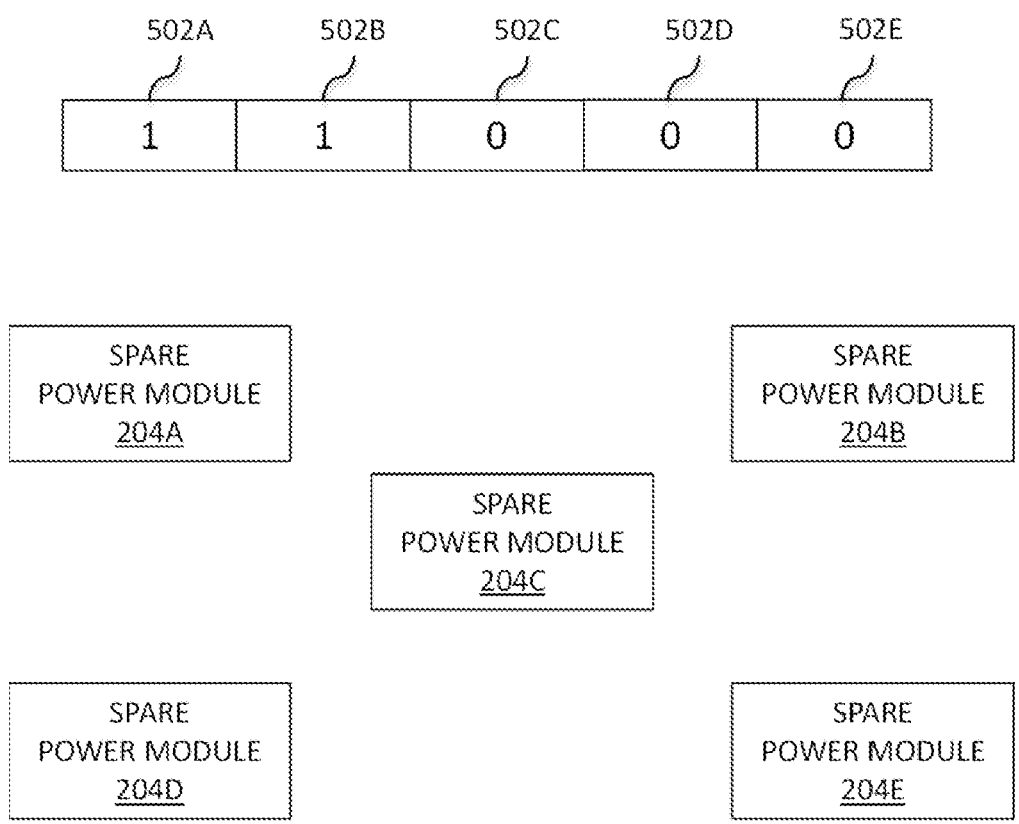

In FIG. 5I, which shows the ON/OFF state a time T8, spare power module 204C, 204D, and 204E have been turned OFF by the reduction module 408 and spare power modules 204A and 204B remain ON, as indicated by the "1" value in 1-bit elements 502A and 502B and the "0" value in each of the 1-bit elements 502C, 502D, and 502E. The spare power modules 204A and 204B being ON provides 40 W of auxiliary power to the set of memory devices 104. The reduction of 60 W of auxiliary power provided to the set of memory devices 104 may be in response to the power detection module 402 and the comparison module 404 determining that the set of memory devices 104 is no longer consuming greater than the fifth threshold mount of power and is consuming greater than the second threshold amount of power, but less than the third threshold amount of power.

Figure 5J:
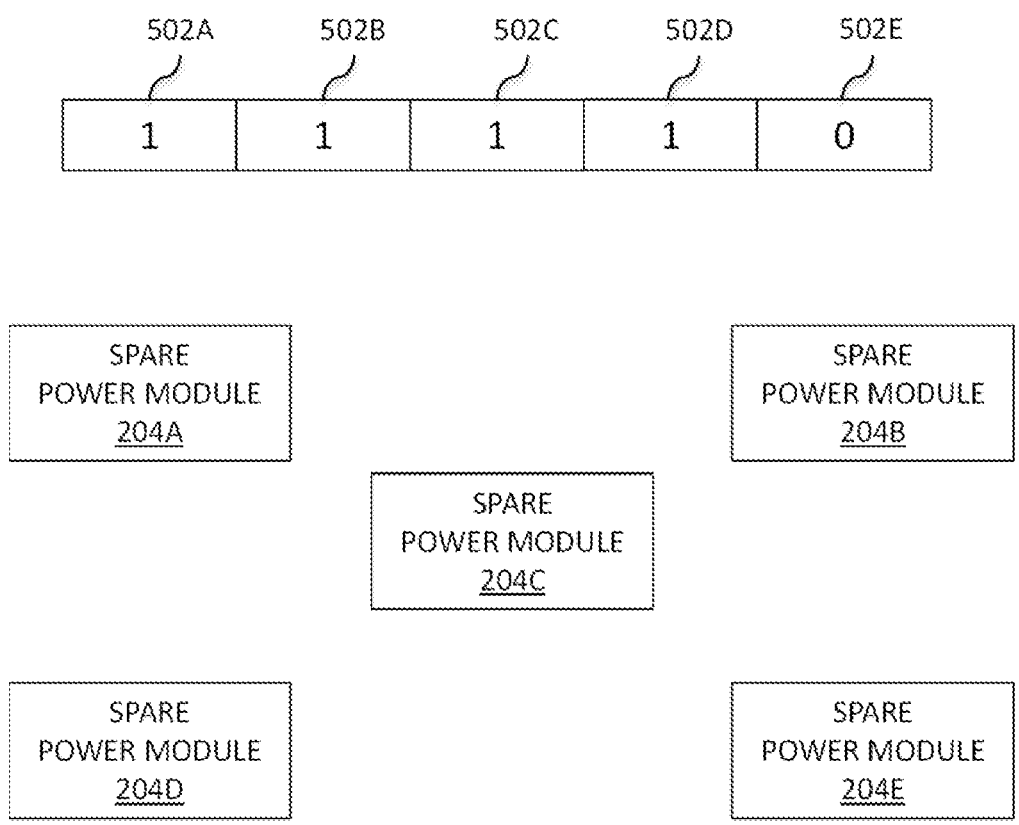

In FIG. 5J, which shows the ON/OFF state a time T9, spare power module 204C and 204D have been turned ON by the throttling module 406 and spare power module 204e remains OFF, as indicated by the "1" value in 1-bit elements 502A, 502B, 502C, and 502D and the "0" value in the 1-bit element 502E. The spare power modules 204A, 204B, 204C, and 204D being ON provides 80 W of auxiliary power to the set of memory devices 104.

The 80 W of auxiliary power may be provided to the set of memory devices 104 in response to the power detection module 402 and the comparison module 404 determining that the set of memory devices 104 is consuming greater than the fourth threshold amount of power and less than the fifth threshold amount of power. The set of memory devices 104 may be consuming greater than the fourth threshold amount of power in response to one or more memory devices 104 being added to the set of memory devices 104 and/or one or more memory devices 104 in the set of memory devices 104 having been replaced by the replacement memory device(s) 104 that consume(s) more power than the replaced memory device(s) 104.

Figure 6:
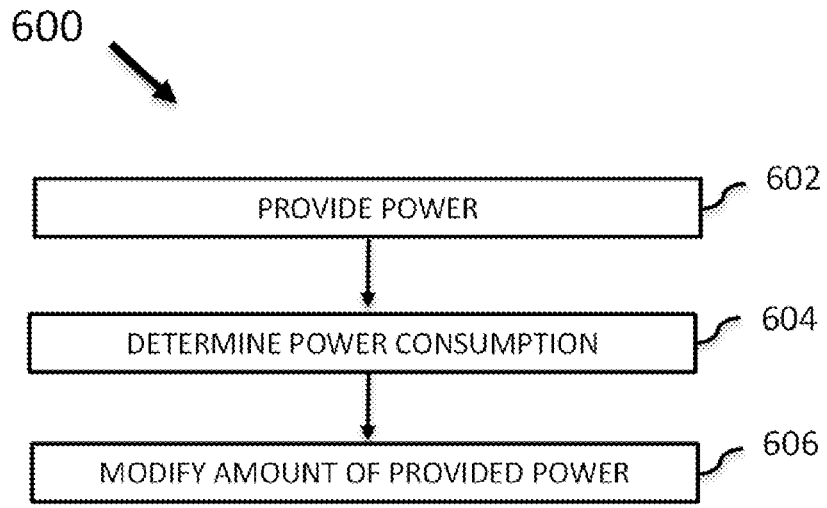
FIG. 6 is a schematic flow chart diagram illustrating one embodiment of a method for managing power in a memory subsystem.

With reference to FIG. 6, FIG. 6 is a schematic flow chart diagram illustrating one embodiment of a method 600 for managing power in a memory subsystem (e.g., a memory subsystem 100). At least in the illustrated embodiment, the method 600 can begin by providing power to a set of memory devices (e.g., a set of memory devices 104) via a set of power modules (e.g., a set of power module 202) (block 602).

A processor and/or processing device (e.g., a power detection module 402) can determine the amount of power being consumed by the set of memory devices 104 (block 604). In response to a predetermined event, the amount of power provided to the set of memory devices 104 is modified via a set of spare power modules (e.g., a set of spare power modules 204) (block 606).

In various embodiments, the predetermined event can include the set of memory devices 104 consuming an amount of power that is greater than and/or equal to a predetermined amount of power. In some embodiments, the amount of power provided to the set of memory devices 104 is modified by increasing the amount of power provided to the set of memory devices 104.

In additional or alternative embodiments, the predetermined event can include the set of memory devices 104 consuming an amount of power that is less than and/or equal to the predetermined amount of power. In some embodiments, the amount of power provided to the set of memory devices 104 is modified by decreasing the amount of power provided to the set of memory devices 104.

Figure 7:
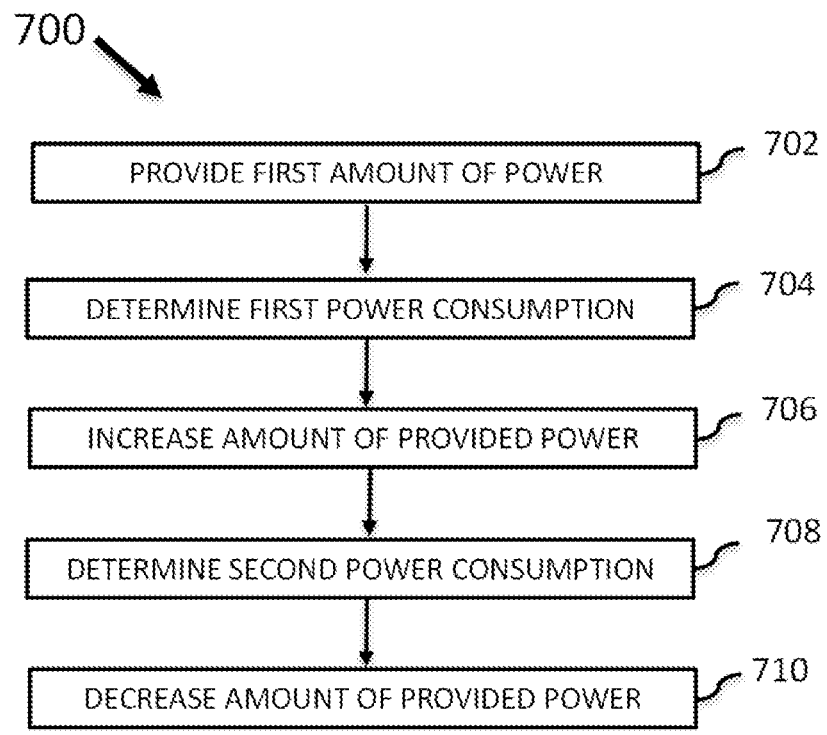
FIG. 7 is a schematic flow chart diagram illustrating another embodiment of a method for managing power in a memory subsystem.

Referring to FIG. 7, FIG. 7 is a schematic flow chart diagram illustrating another embodiment of a method 700 for managing power in a memory subsystem (e.g., a memory subsystem 100). At least in the illustrated embodiment, the method 700 can begin by providing power to a set of memory devices (e.g., a set of memory devices 104) via a set of power modules (e.g., a set of power module 202) (block 702).

A processor and/or processing device (e.g., a power detection module 402) can determine a first amount of power being consumed by the set of memory devices 104 (block 704). In response to the set of memory devices 104 consuming an amount of power that is greater than and/or equal to a predetermined amount of power, the amount of power provided to the set of memory devices 104 can be increased via a set of spare power modules (e.g., a set of spare power modules 204) (block 706).

The power detection module 402 can determine a second amount of power being consumed by the set of memory devices 104 (block 708). In response to the set of memory devices 104 consuming an amount of power that is less than and/or equal to the predetermined amount of power, the amount of power provided to the set of memory devices 104 can be decreased via the set of spare power modules (e.g., a set of spare power modules 204) (block 710).

The amount of power provided to the set of memory devices 104 can be increased by turning ON at least one spare power module 204 in a set of spare power modules 204. Further, amount of power provided to the set of memory devices 104 can be increased by turning OFF at least one spare power module 204 in a set of spare power modules 204.

In addition, each time that the set of memory devices 104 consumes greater than and/or equal to an increased amount of power level, one or more spare power modules 204 can be turned ON to incrementally increase the amount of power provided to the set of memory devices 104. Similarly, each time that the set of memory devices 104 consumes less than and/or equal to an increased amount of power level, one or more spare power modules 204 can be turned OFF to incrementally decrease the amount of power provided to the set of memory devices 104.

Figure 8:
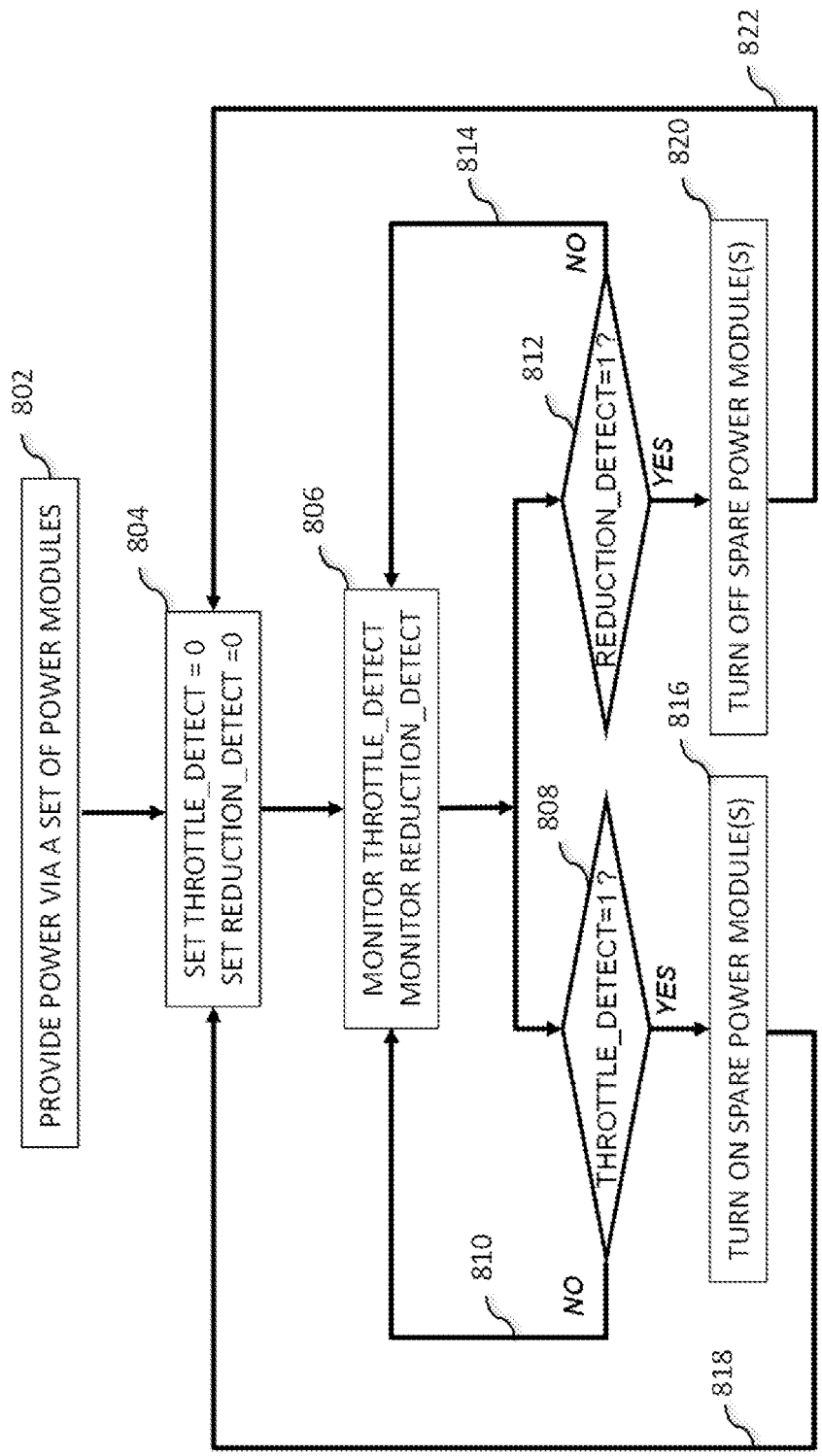
FIG. 8 is a schematic flow chart diagram illustrating yet another embodiment of a method for managing power in a memory subsystem.

With reference to FIG. 8, FIG. 8 is a schematic flow chart diagram illustrating yet another embodiment of a method 800 for managing power in a memory subsystem (e.g., a memory subsystem 100). At least in the illustrated embodiment, the method 800 can begin by providing power to a set of memory devices 104 using a set of power modules 202 (block 802).

A power controller 208 can set a throttle flag equal to zero (e.g., throttle_detect=0) in preparing for determining if the set of memory devices 104 is consuming greater than and/or equal to one or more threshold amounts of power and set a reduction flag equal to zero (e.g., reduction_detect=0) in preparation for determining if the set of memory devices 104 is consuming less than and/or equal to the one or more threshold amounts of power (block 804). The power controller 208 can then monitor the amount of power being consumed by the set of memory devices 104 to make such determine(s) (e.g., throttle_detect and reduction_detect) (block 806).

The power controller 208 can then determine whether the set of memory devices 104 are consuming greater than and/or equal to a threshold amount of power (e.g., throttle_detect=1) (block 808). In response to determining that the set of memory devices 104 is not consuming greater than and/or equal to the threshold amount of power (e.g., a "NO" in block 808), the power controller 208 continues to monitor the monitor the amount of power being consumed by the set of memory devices 104 (return 810).

The power controller 208 can further determine whether the set of memory devices 104 are consuming less than and/or equal to a threshold amount of power (e.g., reduction_detect=1) (block 812). In response to determining that the set of memory devices 104 are not consuming less than and/or equal to the threshold amount of power (e.g., a "NO" in block 812), the power controller 208 continues to monitor the monitor the amount of power being consumed by the set of memory devices 104 (return 814).

In response to determining that the set of memory devices 104 are consuming greater than and/or equal to the threshold amount of power (e.g., a "YES" in block 808), the power controller 208 can turn ON one or more spare power modules 204 (block 816) and resets the throttle detect flag (return 818). In response to determining that the set of memory devices 104 are consuming less than and/or equal to the threshold amount of power (e.g., a "YES" in block 812), the power controller 208 can turn OFF one or more spare power modules 204 (block 820) and resets the reduction detect flag (return 822).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A system, comprising:
   a set of memory devices;
   a set of power modules that provide a constant amount of power to the set of memory devices; and
   a set of spare power modules coupled to the set of memory devices and configured to incrementally increase and decrease an amount of supplemental power provided to the set of memory devices based on a difference between a total amount of power currently being provided to the set of memory devices and a current amount of power being consumed by the set of memory devices,
   wherein the total amount of power currently being provided to the set of memory devices includes the constant amount of power provided to the set of memory device by the set of power modules and a current amount of supplemental power being provided to the set of memory devices by the set of spare power modules.

2. The system of claim 1, wherein the set of memory devices comprises a set of dual in-line memory modules (DIMMs).

3. The system of claim 1, further comprising:
   a power management module coupled to the set of memory devices and the set of spare power modules.

4. The system of claim 3, wherein the power management module is configured to:
   determine the current amount of power being consumed by the set of memory devices;
   determine the total amount of power currently being provided to the set of memory devices;
   determine a difference between the total amount of power currently being provided to the set of memory devices and the current amount of power being consumed by the set of memory devices, a non-zero difference defining a predetermined event; and
   in response to the predetermined event, incrementally increase or incrementally decrease the amount of supplemental power provided to the set of memory devices by the set of spare power modules based on the non-zero difference.

5. The system of claim 4, wherein:
   the predetermined event includes the current amount of power being consumed by the set of memory device being greater than the total amount of power currently being provided to the set of memory devices; and
   in response to the predetermined event, the power management module is configured to incrementally increase the amount of supplemental power provided to the set of memory devices via the set of spare power modules.

6. The system of claim 5, wherein incrementally increasing the amount of supplemental power to the set of memory devices comprises turning ON one or more spare power modules in the set of spare power modules.

7. The system of claim 6, wherein incrementally increasing the amount of supplemental power to the set of memory devices further comprises turning ON at least one additional spare power module in the set of spare power modules.

8. The system of claim 6, wherein the power management module is further configured to:
   determine a subsequent total amount of power being consumed by the set of memory devices;
   determine that the subsequent amount of power being consumed by the set of memory device is less than the subsequent total amount of power being provided to the set of memory devices; and
   in response to determining that the subsequent amount of power being consumed by the set of memory device is less than the subsequent total amount of power being provided to the set of memory devices, incrementally decreasing the amount of supplemental power provided to the set of memory devices via turning OFF at least one spare power module in the one or more spare power modules.

9. The system of claim 4, wherein:
   the predetermined event includes the current amount of power being consumed by the set of memory device being less than the total amount of power currently being provided to the set of memory devices; and
   in response to the predetermined event, the power management module is configured to incrementally decrease the amount of supplemental power provided to the set of memory devices via the set of spare power modules.

10. The system of claim 9, wherein incrementally decreasing the amount of supplemental power to the set of memory devices comprises turning OFF one or more spare power modules in the set of spare power modules.

11. The system of claim 10, wherein incrementally decreasing the amount of supplemental power to the set of memory devices further comprises turning OFF at least one additional spare power module in the set of spare power modules.

12. An apparatus, comprising:
   a power management module coupleable to a set of memory devices and to a set of spare power modules, the power management module configured to:
      determine a current amount of power being consumed by the set of memory devices,
      determine a total amount of power currently being provided to the set of memory devices by a set of power modules and the set of spare power modules,
      determine a difference between the total amount of power currently being provided to the set of memory devices and the current amount of power being consumed by the set of memory devices, a non-zero difference defining a predetermined event, and
      in response to the predetermined event, incrementally increase or incrementally decrease an amount of supplemental power provided to the set of memory devices by the set of spare power modules based on the non-zero difference.

13. The apparatus of claim 12, wherein:
   the predetermined event includes the current amount of power being consumed by the set of memory device being greater than the total amount of power currently being provided to the set of memory devices; and in response to the predetermined event, the power management module is configured to incrementally increase the amount of supplemental power provided to the set of memory devices via turning ON one or more spare power modules in the set of spare power modules.

14. The apparatus of claim 12, wherein:

the predetermined event includes the current amount of power being consumed by the set of memory device being less than the total amount of power currently being provided to the set of memory devices; and in response to the predetermined event, the power management module is configured to incrementally decrease the amount of supplemental power provided to the set of memory devices via turning OFF at least one spare power module in the one or more spare power modules.

15. A method, comprising:

determining a total amount of power currently being provided to a set of memory devices via a set of power modules and a set of spare power modules;

determining a current amount of power being consumed by the set of memory devices;

determining a difference between the total amount of power currently being provided to the set of memory devices and the current amount of power being consumed by the set of memory devices, a non-zero difference defining a predetermined event, and in response to the predetermined event, incrementally increase or incrementally decrease an amount of supplemental power provided to the set of memory devices by the set of spare power modules based on the non-zero difference.

16. The method of claim 15, wherein:

the predetermined event includes the current amount of power being consumed by the set of memory device being greater than the total amount of power currently being provided to the set of memory devices; and in response to the predetermined event, incrementally increasing the amount of supplemental power provided to the set of memory devices via the set of spare power modules.

17. The method of claim 16, wherein incrementally increasing the amount of supplemental power to the set of memory devices comprises turning ON one or more spare power modules in the set of spare power modules.

18. The method of claim 17, further comprising:

determining a subsequent total amount of power being provided to a set of memory devices; determining a subsequent total amount of power being consumed by the set of memory devices; determining that the subsequent amount of power being consumed by the set of memory device is less than the subsequent total amount of power being provided to the set of memory devices; and in response to determining that the subsequent amount of power being consumed by the set of memory device is less than the subsequent total amount of power being provided to the set of memory devices, incrementally decreasing the amount of supplemental power provided to the set of memory devices via turning OFF at least one spare power module in the one or more spare power modules.

19. The method of claim 15, wherein:

the predetermined event includes the current amount of power being consumed by the set of memory device being less than the total amount of power currently being provided to the set of memory devices; and in response to the predetermined event, incrementally decreasing the amount of supplemental power provided to the set of memory devices via the spare power modules.

20. The method of claim 19, wherein incrementally decreasing the amount of supplemental power to the set of memory devices comprises turning OFF one or more spare power modules in the set of spare power modules.

* * * * *